3,047,354
OIL IN WATER EMULSIONS FOR
TEXTILE PRINTING
Erling Owren, Foster, R.I., assignor to Cranston Print Works Company, Cranston, R.I., a corporation of Rhode Island
No Drawing. Filed July 15, 1959, Ser. No. 827,152
5 Claims. (Cl. 8—86)

This invention relates to oil-in-water emulsion vehicles for carrying pigments or dyes and to colored compositions and coloring compositions and coloring processes using them.

Dispersions of colors are used in many coloring processes. Sometimes these dispersions are solutions of colors and in other cases, particularly in printing processes, the color in a more or less insoluble form is incorporated in more viscous vehicles such as pastes. The earliest of such vehicles, and still a very common type, is that formed with various carbohydrate gums. Such dispersions have many disadvantages. Often they do not keep and in some cases are rapidly thinned by certain materials such as stabilized diazonium compounds. In other cases it is necessary to wash out the ingredients of the paste after coloring has taken place, otherwise the material colored may be bodied or sized and lose some of its desirable softness of hand. Washing out the carbohydrate vehicles also results in removing some of the color, which is a waste, and also results in a loss of brilliance and strength of the design or shade.

A marked advance resulted by the use of an oil-in-water emulsion for coloring with vat dyes. This is described in Borstelmann and Fordemwalt Patent 2,597,281. It is with improvements in this type of composition and methods of coloring therewith to which the copending application of Klein Serial No. 661,995, filed May 28, 1957, now abandoned, relates.

The emulsions described in the Klein application are an important improvement in the art. They have been found, in practice, however, to have one serious deficiency. While, of themselves, they are quite stable, they are easily broken when they come in contact with water-in-oil or even some other oil-in-water pigmented resin dispersions, such as are used in printing textiles. The textile mill cannot always completely clean the printing equipment and some of the water-in-oil type pigmented resin dispersions contaminates corners or recesses in such equipment. Even more important, a multi-colored textile print requires successive impressions on the cloth by different printing compositions. Some of these will often be water-in-oil emulsions while others will be those described in the Klein application.

Since this is a high speed continuous operation around a large drum with successive contacts with small printing rollers each printing a different color, inevitably there is carry over from the water-in-oil emulsions to the oil-in-water emulsions of the Klein application. When dispersions come into contact with the Klein emulsions, the latter break in a very few minutes. Such a situation renders the Klein emulsions usable only with difficulty, in practice, especially when they are being used for the printing of azoic colors (i.e., a mixture of a stabilized diazo and a coupler, with the printing followed by acid aging to effect formation of an azoic color). It is with these colors that the problem principally arises, although it can arise with any of the other coloring materials used in the Klein emulsions.

I have found that this serious deficiency of the Klein emulsions can be corrected by the inclusion of an oil soluble cellulose ether in the inner disperse phase. When this is done, the emulsions, very surprisingly no longer break when they come into contact with the water-in-oil resins contaminating printing rolls or other equipment.

The Klein application utilizes oil-in-water emulsions in which the emulsifier has the general formula

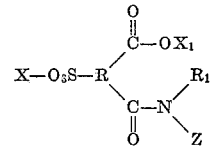

in which X and $X_1$ are cations such as hydrogen and salt-forming materials, R is the residue of an aliphatic polycarboxylic acid, $R_1$ is alkyl, alkoxyalkyl or hydroxyalkyl and Z is hydrogen or

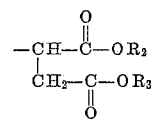

where $R_2$ and $R_3$ are hydrogen, alkyl or other cations.

While there are a large number of emulsifiers included in the broader aspects of the Klein invention, as defined by the formula above, two general types are of particular importance. In both of these cases they are sulfosuccinic acid derivatives. One type constitutes aspartate amides of sulfosuccinic acid and its salts. These are described in U.S. Patent 2,438,092. Another group of large practical importance are the higher fatty acid amides of sulfosuccinic acid which are described in U.S. Patent 2,252,401.

One can also use emulsifiers of a somewhat different class, in which the principal ingredient is a fatty acid soap such as ammonium or sodium stearate palmitate, or oleate, and a small amount of any of the well known non-ionic wetting agents of the polyoxyethylene type, such as polyethylene glycol ethers of stearamido propanol or stearamidoethanol, and the like, or any of the other well known polyoxyethylene non-ionic surfactants.

The actual coloring of fabrics or fibers with the emulsions of the Klein application may be effected in two general ways. In the first, a colored emulsion can be prepared with the desired amount of coloring matter or the components necessary to produce it present, and if desired, together with such other chemicals as may be necessary for the coloring process, such as for example alkali and a reducing agent in the case of vat dye printing; or a clear emulsion may be made, that is to say an emulsion of satisfactory viscosity in which there is no coloring matter present and the dyer may add thereto the desired amount of coloring matter either in the form of a solution, a paste or other type of dispersion. The fact that it is not necessary to make up the final colored emulsion initially is of great practical importance. The dyer or printer may purchase either the clear emulsion or make it up himself as a stock emulsion and then add to it the amounts of coloring matter called for by the requirements of the final colored fabric or fiber. The same flexibility applies, of course, to my improvement on the Klein emulsions except that the cellulose ether must be dissolved in the oil phase before emulsifying it. Consequently, either the clear emulsion purchased must already have it as an ingredient of the oil phase or the printer must include it in the oil phase before making up his stock emulsion.

My invention is especially useful in the type of coloring presented by dyes such as vat dyes, sulfur dyes, azoics and the like which may be considered loosely as dyes which have to be developed i.e., indirect dyes; that is to say there is applied to the fiber not the final color but a different form thereof; or components which react to form the final color. The first case is represented by vat dyes and sulfur dyes which have to be applied and then treated to change their form. In the case of ordinary vat dyes, this will require chemicals in the emulsion which reduce the dye so that it becomes substantive to the fiber and it is then reoxidized by air or chemicals to its insoluble form. In the case of sulfur dyes, soluble vats and the like, the dye is applied in the form in which it is substantive for the fiber and is then transformed into the final form by after-treatment. Another type of developed dye is the azoic coloring matter in which the diazo component is stabilized against azoic coupling and coupling does not take place until suitable after-treatment is used. In this case all the components of the coloring are present but have not yet reacted. It is with the developable dyes, especially the azoics, that the present invention presents its greatest advantages over the emulsions as described by Klein.

The amount of emulsifying agent used in preparing the Klein emulsions is not critical. In general, optimum results are obtained with about 1–2% of the total weight of the emulsion. This, however, will vary with the viscosity of the emulsion, with the chemicals added to it, and with the technique of use.

The basic oil-in-water emulsion contains the water, the oil, usually a hydrocarbon oil, and the emulsifying agent. However, other ingredients may be present. For example, the outer water phase may contain hydrotropic or other hydrophilic material to withstand high salt content and other surface active materials, and thickeners may be used. Usually the main thickener is the oil. In the improvement of my invention the oil contains from 2 to 5% of its weight of an oil soluble cellulose ether to protect the emulsion against contact with water-in-oil dispersions.

The proportions of the inner or disperse oil phase can vary over an enormous range, from as low as 15% to as much as 80%. Essentially, the oil content determines the viscosity or body of the final emulsion and, as has been pointed out above, this will vary greatly depending on whether the coloring process to be used is one producing an overall coloring or is a printing process in which a design is applied to a portion of a fabric. Of course, if the concentrated emulsion is diluted with large amounts of water to make a dye bath, the above percentages are correspondingly reduced.

The chemical composition of the oil used is also not critical. In general it should be inert and not adversely affect either the coloring matter, the added chemicals or the fiber. For practical purposes hydrocarbon oil, such as petroleum fractions, are the ones to be used. They are cheap, inert and available in a very wide range of viscosities and boiling points. For purposes of the present invention it does not make a great deal of difference whether the hydrocarbon is predominantly aliphatic or predominantly aromatic. However, since the former type is usually cheaper and is thoroughly satisfactory, it is ordinarily preferred.

It is desirable that there be no significant evaporation of the oil phase and very low-boiling hydrocarbons are therefore not desirable. However, no exact limit of boiling point is vital and the commonly available oils having boiling point ranges whose upper limit for their mixed volatile constituents reaches 300–400° C. are satisfactory. Lower boiling range hydrocarbons can be used, as it is really the boiling point of the low-boiling constituents which sets the limit. An oil having a distillation range up to about 250° F. (126° C.) is most commonly used. Viscosity of the oil is also not critical. It should be fairly low. Viscosities of 5 centipoises or less are desirable. A thin emulsion for overall coloring is desired. When, however, the emulsion is to be used as a printing paste, more viscous oils are desirable and those having a viscosity range from 20–60 poises are satisfactory, though for shallow fine-grain printing rolls, the viscosity may be 10 poises or even less.

Especially when some hydrophilic or hydrotropic material is added to the aqueous phase, some foaming may result. With large equipment some foaming is normally not objectionable. However, if the equipment is to be used to its limit, it is sometimes desirable to add a very small amount of an anti-foaming agent, for example about 0.1% may be used, and any suitable anti-foamer, such as octyl alcohol, is satisfactory.

The cellulose ethers which are used in my improvement on the Klein emulsions comprise those ethers of cellulose which are soluble in the oil used as the oil phase of the emulsion. These are especially alkylated celluloses such as ethyl, propyl, butyl and the like ethers of cellulose. They are also substituted alkyl ethers, such as cyanoethyl, chlorethyl, chlorpropyl and the like. An especially effective substituted alkyl ether is ethoxyethyl cellulose. The oil solubility is a function of the nature of the etherizing group and the extent of the alkylation of the cellulose. Larger etherifying groups, especially higher alkyl (butyl, lauryl, octadecyl) or aralkyl (benzyl, substituted benzyl) favor oil solubility and require a lesser amount of etherification than the cellulose ethers in which the etherifying group has hydrophyllic substituents. In fact, such substituents can well render the ethers too insoluble in the oil for such use. The essential criterion is solubility in the oil and there should be very little solubility in water. The more soluble the cellulose ether is in the oil, the less the total amount which is needed to effect the improvement which is my invention. One very effective cellulose ether is a commercially available ethylated cellulose having 46–49% ethoxyl and or viscosity of 300 centipoises. Another is a commercailly available ethoxyethyl cellulose.

The following examples will illustrate my invention. Parts are by weight unless otherwise specified and parts by volume are to parts by weight as milliliters are to grams.

*Example 1*

A 2.5% solution of ethylated cellulose in a hydrocarbon solvent is prepared by heating to 140° F. a mixture of 374 parts of a petroleum hydrocarbon oil having approximately 15% aromatics, 5% olefins, and 80% saturated hydrocarbons with 10 parts of ethylated cellulose analyzing 46–49% ethoxyl. The mixture is stirred until clear and then cooled.

20 parts by volume of this solution is slowly added, with vigorous stirring, to a mixture of 4.5 parts by volume of water, 25 parts of 5% solution of carboxymethyl cellulose and 0.5 part by volume of a dilute aqueous solution of an emulsifier mixture comprising principally the ammonium soap of stearic acid and a small amount of a non-ionic polyoxyethylene type surfactant. This results in a creamy white emulsion which can be used to make coloring emulsions as described below.

*Example 2*

A printing emulsion is prepared by adding 20 parts of a printing paste of the Azoic Red having New Color Index No. 6 to 108 parts of the emulsion of Example 1. The printing paste is a stoichiometric mixture of diazotized 5-chloro-2-amino toluene stabilized with 4-sulfoanthranilic acid with the o-toluide of beta oxynaphthoic acid, there being also present at least a stoichiometric amount of caustic soda and enough water to make a thick paste.

*Example 3*

100 parts of the emulsion of Example 2 is stirred while 1 part of a pigmented water-in-oil resin emulsion is added. The latter emulsion is prepared by emulsifying 2,320 parts of water in 630 parts of petroleum hydrocarbon containing 50 parts of a concentrate composed of 290 parts of a 50% solution of styrenated alkyd resin in petroleum hydrocarbon, 60 parts of ammonium sulfate, 110 parts of water, 15 parts of mineral oil and 25 parts of toluene, and then stirring 10 parts of this emulsion with 10 parts of a pigment paste.

A control emulsion is prepared by repeating Examples 1 and 2, omitting the ethylated cellulose, and therefore using 20 parts by volume of the petroleum hydrocarbon oil instead of the ethylated cellulose solution in making the emulsion. One hundred parts of this is mixed with 1 part of the water-in-oil emulsion, as described in the preceding paragraph.

The emulsion mixture of the first paragraph remained stable for days while the control mixture of the second paragraph broke in a very few minutes.

*Example 4*

The procedures of Examples 1, 2 and 3 were followed except that the emulsifier in Example 1 is replaced by 0.5 part by volume of a 35% aqueous paste of N-octadecyl disodium succinamate. Again the emulsion containing the ethylated cellulose was stable for days in contact with the water-in-oil resin dispersion.

*Example 5*

Example 4 was repeated using, however, the following emulsifying agents in place of the N-octadecyl disodium succinamate:

a. N-dodecyl disodium succinamate.
b. N-octadecyl-N-disodium succino disodium sulfosuccinamate.
c. N-dodecyl-N-disodium succinyl disodium sulfosuccinamate.
d. N-hexadecyl-N-disodium succinyl disodium sulfosuccinamate.
e. Disodium-N-(dimethyl-1,2-dicarboxyethyl) N-sulfosuccinamate.
f. Disodium-N-(diamyl-1,2-dicarboxyethyl) N-octadecyl sulfosuccinamate.
g. Disodium - N - (dibutyl-1,2-dicarboxyethyl) N-octadecyl sulfosuccinamate.
h. Bis-2-ethylhexyl disodium sulfosuccinamate.
i. N-hexadecyl disodium succinamate.

In each instance when tested by the procedure of Example 3 the print color emulsion containing the ethyl cellulose was stable for several days, but the paste in which no ethyl cellulose was present broke after a few minutes.

*Example 6*

The procedures of Example 4 were repeated using the following commercial dyes in place of the Azoic Red No. 6:

Azoic Blue CI No. 2
Azoic Yellow CI No. 3
Azoic Red CI No. 2
Azoic Red CI No. 1
Azoic Yellow CI No. 2

When these were tested for stability by the procedure in Example 3 the pastes containing the Ethocel were stable for days.

I claim:

1. In a vehicle suitable for use in the coloring of fibrous materials with indirect dyes, said vehicle being compatible with pigmented water-in-oil emulsions and comprising an oil-in-water emulsion having as an inner disperse phase from about 15 to about 80% by weight of an inert liquid hydrocarbon, said hydrocarbon having the upper limit of its boiling range between about 300° and about 400° C., and as an outer phase water and an emulsifier said emulsifier being selected from the group consisting of (1) those having the general formula

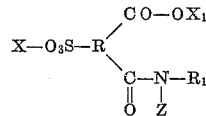

in which X and $X_1$ are cations selected from the group consisting of hydrogen and salt forming materials, R is a saturated hydrocarbon residue of an aliphatic polycarboxylic acid, $R_1$ is selected from alkyl, hydroxyalkyl and alkoxyalkyl, and Z is selected from hydrogen and

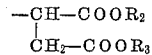

in which $R_2$ and $R_3$ are selected from hydrogen, alkyl and salt forming cations; and (2) a mixture of a major amount of an ammonium soap of a fatty acid with a small amount of a nonionic polyoxyethylene surfactant, the improvement which comprises including in the said inner disperse phase from 2 to 5% by weight based on the weight of said disperse phase of a cellulose ether, said ether being substantially insoluble in water and soluble in said inert liquid hydrocarbon.

2. The composition of claim 1 in which the emulsifier is a mixture comprising a major proportion of an ammonium soap of a higher fatty acid and a minor proportion of a polyoxyethylene non-ionic surfactant.

3. The composition of claim 1 in which the emulsifier is

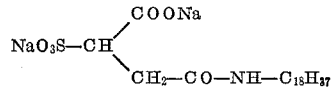

4. A colored emulsion having the composition of claim 1 and including an azoic coloring mixture, said coloring mixture having a pH not less than 10.

5. The composition of claim 4 in which azoic coloring mixture is that of New Color Index Azoic Red 6.

References Cited in the file of this patent
UNITED STATES PATENTS

| | | |
|---|---|---|
| 2,252,401 | Jaeger | Aug. 12, 1941 |
| 2,332,121 | Trowell | Oct. 19, 1943 |
| 2,438,092 | Lynch | Mar. 16, 1948 |
| 2,597,281 | Borstelmann | May 20, 1952 |

OTHER REFERENCES

Sisley et al.: Encyclopedia of Surface Active Agents, Chemical Publishing Co., N.Y., 1952, page 66.